US011858000B2

(12) United States Patent
Kojima et al.

(10) Patent No.: US 11,858,000 B2
(45) Date of Patent: Jan. 2, 2024

(54) ULTRASONIC DEVICE AND ULTRASONIC SENSOR

(71) Applicant: SEIKO EPSON CORPORATION, Tokyo (JP)

(72) Inventors: Chikara Kojima, Matsumoto (JP); Koji Ohashi, Matsumoto (JP); Tomohiro Sayama, Matsumoto (JP); Seiji Izuo, Shiojiri (JP); Kanechika Kiyose, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 403 days.

(21) Appl. No.: 17/248,290

(22) Filed: Jan. 19, 2021

(65) Prior Publication Data

US 2021/0220874 A1 Jul. 22, 2021

(30) Foreign Application Priority Data

Jan. 21, 2020 (JP) ................................. 2020-007660

(51) Int. Cl.
*B06B 1/06* (2006.01)

(52) U.S. Cl.
CPC .................................. *B06B 1/0622* (2013.01)

(58) Field of Classification Search
CPC ............................ B06B 1/0622; B06B 1/0629
See application file for complete search history.

(56) References Cited

U.S. PATENT DOCUMENTS

| | | | | |
|---|---|---|---|---|
| 2013/0153873 A1* | 6/2013 | Watanabe | H10K 50/00 | 438/46 |
| 2013/0338507 A1* | 12/2013 | Onishi | A61B 8/461 | 600/459 |
| 2015/0258573 A1* | 9/2015 | Kojima | B06B 1/0622 | 310/327 |
| 2015/0345987 A1* | 12/2015 | Hajati | G01N 29/34 | 73/661 |
| 2017/0028440 A1* | 2/2017 | Kiyose | H10N 30/073 | |
| 2017/0179365 A1* | 6/2017 | Yonemura | B06B 1/0622 | |
| 2018/0277737 A1* | 9/2018 | Ohashi | A61B 8/085 | |
| 2020/0303618 A1* | 9/2020 | Kojima | H10N 30/883 | |

FOREIGN PATENT DOCUMENTS

| | | |
|---|---|---|
| CN | 106388856 A | 2/2017 |
| JP | 2015188202 A | 10/2015 |
| JP | 2015188208 A | 10/2015 |

* cited by examiner

*Primary Examiner* — Bryan P Gordon
(74) *Attorney, Agent, or Firm* — CHIP LAW GROUP

(57) ABSTRACT

Provided is an ultrasonic device including a substrate and a vibration plate provided on the substrate and having one or more vibrators configured to generate an ultrasonic wave by vibration. The vibration plate has a movable portion provided with the vibrator and configured to vibrate accompanying with the vibration of the vibrator, and a fixed portion fixed to the substrate. A vibration frequency of a reflected wave based on a wave transmitted from the movable portion and received by the movable portion is outside a vibration frequency band region of the vibrator.

16 Claims, 14 Drawing Sheets

ULTRASONIC DEVICE AND ULTRASONIC SENSOR

The present application is based on, and claims priority from JP Application Serial Number 2020-007660, filed Jan. 21, 2020, the disclosure of which is hereby incorporated by reference herein in its entirety.

BACKGROUND

1. Technical Field

The present disclosure relates to an ultrasonic device and an ultrasonic sensor.

2. Related Art

The related art discloses an ultrasonic device including a substrate and a vibration plate having vibrators. An example of such an ultrasonic device includes an ultrasonic sensor disclosed in JP-A-2015-188202. The ultrasonic sensor includes a substrate on which openings are formed, a vibration plate provided on the substrate so as to close the openings, active portions each serving as a vibrator formed by overlapping a piezoelectric layer, a first electrode, and a second electrode, and a vibration prevention portion provided between the active portions.

However, in the ultrasonic device including the substrate and the vibration plate having the vibrators in the related art, a formation portion or the like of the vibrators may vibrate due to crosstalk accompanying with vibration of the vibrators, and for example, vibration of a reception element or the like among the vibrators may be affected by the crosstalk and reception accuracy may be lowered.

SUMMARY

An object of the present disclosure is to prevent accuracy of an ultrasonic device from lowering.

An ultrasonic device according to the present disclosure for solving the problem described above includes a substrate, and a vibration plate provided on the substrate and having one or more vibrators configured to generate an ultrasonic wave by vibration. The vibration plate has a movable portion provided with the vibrator and configured to vibrate accompanying with the vibration of the vibrator, and a fixed portion fixed to the substrate. A vibration frequency of a reflected wave based on a wave transmitted from the movable portion and received by the movable portion is outside a vibration frequency band region of the vibrator.

DESCRIPTION OF EXEMPLARY EMBODIMENTS

Figure 1:
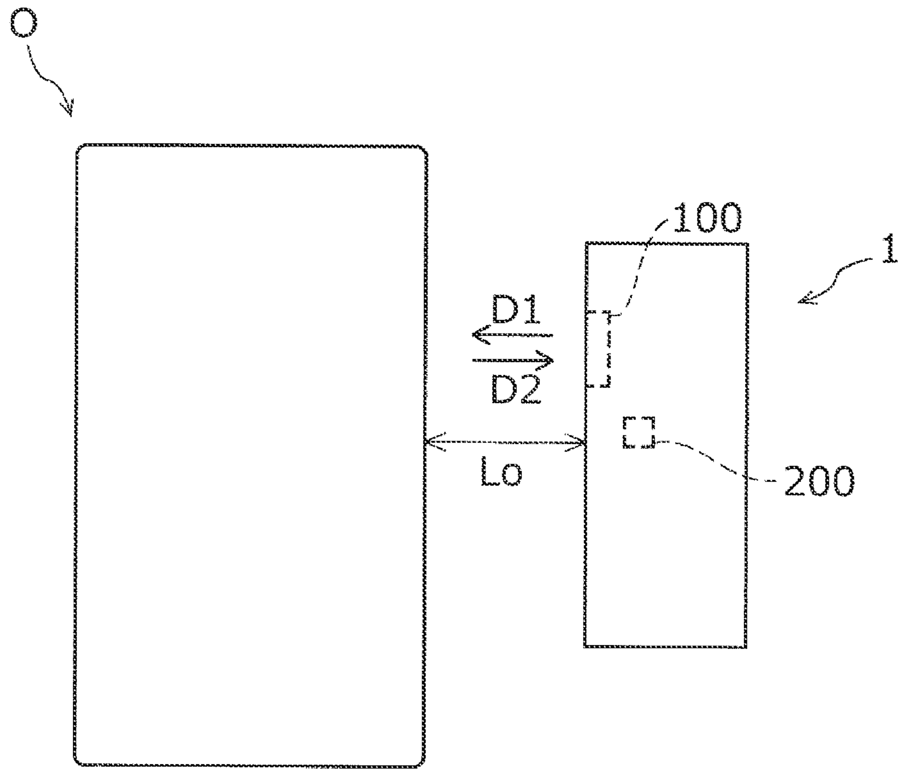
FIG. 1 is a schematic diagram showing an ultrasonic sensor according to a first embodiment, serving as an example of an ultrasonic device according to the present disclosure.

First, the present disclosure will be schematically described.

An ultrasonic device according to a first aspect of the present disclosure for solving the problem described above includes a substrate and a vibration plate provided on the substrate and having one or more vibrators configured to generate an ultrasonic wave by vibration. The vibration plate has a movable portion provided with the vibrator and configured to vibrate accompanying with the vibration of the vibrator, and a fixed portion fixed to the substrate. A vibration frequency of a reflected wave based on a wave transmitted from the movable portion and received by the movable portion is outside a vibration frequency band region of the vibrator.

According to this aspect, the vibration frequency of the reflected wave (a crosstalk vibration frequency) based on the wave transmitted from the movable portion and received by the movable portion is outside the vibration frequency band region of the vibrator. Therefore, vibration due to crosstalk in a vibrator formation portion can be prevented from affecting the vibration of the vibrator. That is, it is possible to prevent accuracy of the ultrasonic device from lowering. Here, the crosstalk refers to that a reception element is vibrated accompanying with driving of a transmission element and sensitivity of the reception element is affected.

The ultrasonic device according to a second aspect of the present disclosure is based on the first aspect, in which the vibration frequency of the reflected wave is higher than the vibration frequency band region of the vibrator.

If the crosstalk vibration frequency is lower than the vibration frequency band region of the vibrator, even when a crosstalk vibration frequency in a primary mode is outside the vibration frequency band region of the vibrator, a crosstalk vibration frequency in a secondary mode or a tertiary mode may fall within the vibration frequency band region of the vibrator. However, according to this aspect, the crosstalk vibration frequency is higher than the vibration frequency band region of the vibrator. Therefore, the crosstalk vibration frequency in the secondary mode or the tertiary mode can be prevented from falling within the vibration frequency band region of the vibrator.

The ultrasonic device according to a third aspect of the present disclosure is based on the second aspect, in which a plurality of vibrators are provided, a first wall portion is provided between the vibrators in the movable portion, a second wall portion is provided at a fixed portion side of a vibrator disposed at an end in arrangement of the plurality of vibrators, on a side of the second wall portion opposite to the vibrator is a space portion or a member formed of a material different from that of the second wall portion, and a volume of the space portion or the member formed of a material different from that of the second wall portion is adjusted to be equal to or smaller than a predetermined volume, so that the vibration frequency of the reflected wave is adjusted to be higher than the vibration frequency band region of the vibrators.

According to this aspect, the crosstalk vibration frequency can be simply adjusted to be higher than the vibration frequency band region of the vibrators by adjusting the volume of the space portion or the member formed of a material different from that of the second wall portion to be equal to or smaller than the predetermined volume.

The ultrasonic device according to a fourth aspect of the present disclosure is based on the first aspect, and further includes a reinforcement plate that reinforces the substrate.

The substrate may be thin and easy to break, but according to this aspect, the reinforcement plate that reinforces the substrate is provided, so that the substrate can be prevented from breakage.

The ultrasonic device according to a fifth aspect of the present disclosure is based on the fourth aspect, in which the vibrator is provided on a surface of the vibration plate at a first direction side of the substrate, and the reinforcement plate is provided at the first direction side of the vibration plate.

According to this aspect, the reinforcement plate is provided at the first direction side of the vibration plate. Therefore, in the ultrasonic device configured to transmit ultrasonic waves at a second direction (a direction opposite to the first direction) side, the substrate can be prevented from breakage and accuracy of the ultrasonic device can be prevented from lowering.

The ultrasonic device according to a sixth aspect of the present disclosure is based on the fifth aspect, and further includes an intermediate member provided between the reinforcement plate and the vibration plate.

According to this aspect, the intermediate member is provided between the reinforcement plate and the vibration plate. Therefore, even in a configuration in which the reinforcement plate and the vibration plate are not directly in contact with each other, the ultrasonic device can be simply configured to transmit ultrasonic waves at the second direction side.

The ultrasonic device according to a seventh aspect of the present disclosure is based on the fourth aspect, in which the vibrator is provided on a surface of the vibration plate at a first direction side of the substrate, and the reinforcement plate is provided at a second direction (a direction opposite to the first direction) side of the substrate.

According to this aspect, the reinforcement plate is provided at the second direction side of the vibration plate. Therefore, in the ultrasonic device configured to transmit ultrasonic waves at the first direction side, the substrate can be prevented from breakage and accuracy of the ultrasonic device can be prevented from lowering.

The ultrasonic device according to an eighth aspect of the present disclosure is based on the seventh aspect, and further includes an intermediate member provided between the reinforcement plate and the substrate.

According to this aspect, the intermediate member is provided between the reinforcement plate and the substrate. Therefore, even in a configuration in which the reinforcement plate and the substrate are not directly in contact with each other, the ultrasonic device can be simply configured to transmit ultrasonic waves at the first direction side.

An ultrasonic sensor according to a ninth aspect of the present disclosure includes the ultrasonic device according to any one of the first to eighth aspects, and a timer configured to measure time up to reception of a reflected wave of an ultrasonic wave transmitted by the vibration of the vibrator.

According to this aspect, it is possible to prevent accuracy from lowering and measure the time up to reception of the reflected wave of the ultrasonic wave transmitted by the vibration of the vibrator.

Hereinafter, embodiments of the present disclosure will be described with reference to accompanying drawings.

First Embodiment

First, an ultrasonic sensor 1 according to a first embodiment, serving as an example of an ultrasonic device according to the present disclosure, will be described with reference to FIGS. 1 to 9.

Figure 8:
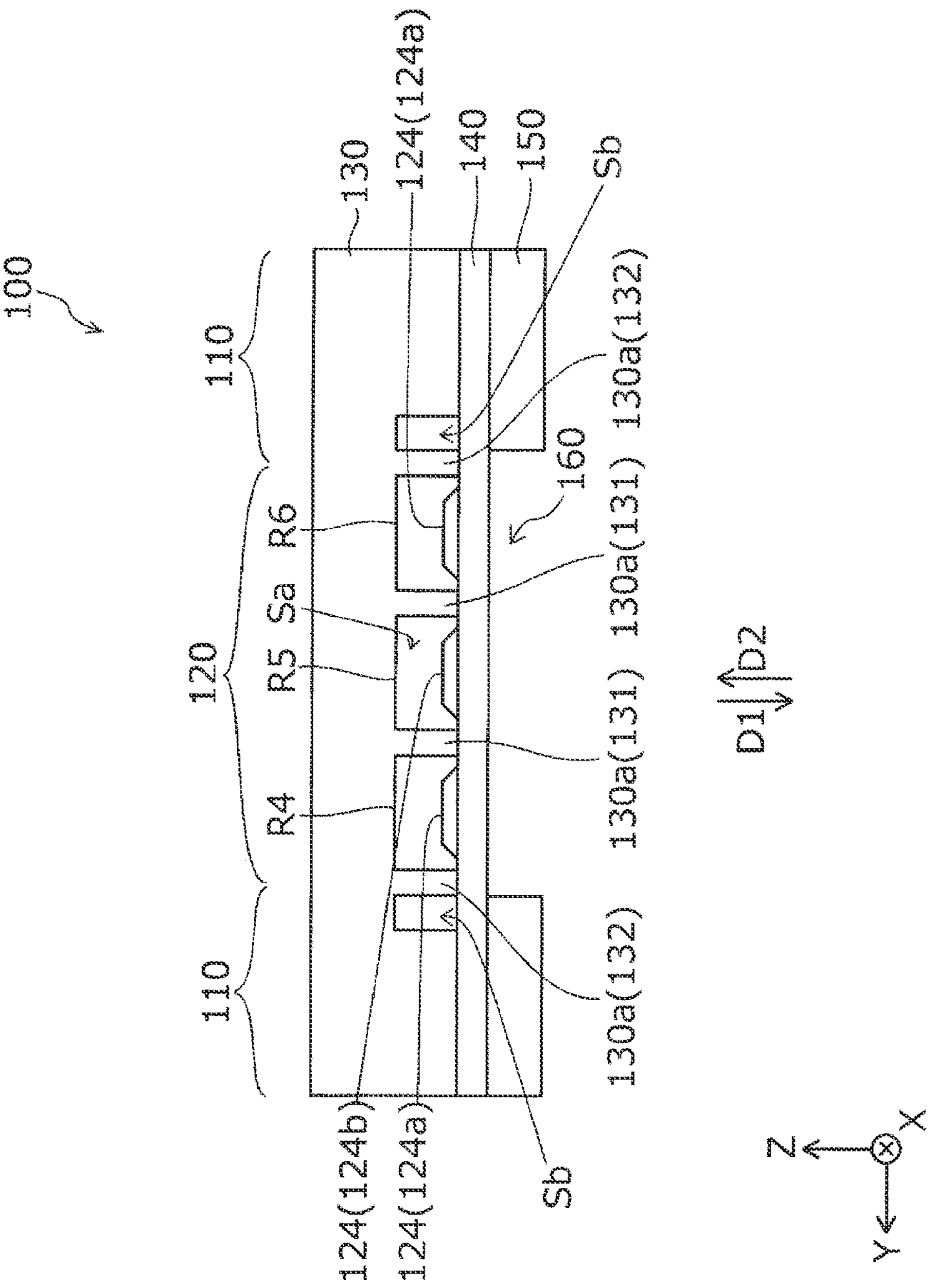
FIG. 8 is a schematic cross-sectional view showing the transmission and reception unit in FIG. 3 in a simplified manner.

As shown in FIG. 1, the ultrasonic sensor 1 includes a transmission and reception unit 100 that transmits ultrasonic waves in a transmission direction D1 and receives ultrasonic waves that are reflected by an object O and move in a reception direction D2. As will be described later in detail, the transmission and reception unit 100 includes a transmission element **124*a* that transmits ultrasonic waves and a reception element 124*b* that receives ultrasonic waves transmitted from the transmission element 124*a* as shown in FIG. 8**.

The ultrasonic sensor 1 further includes a timer 200 that measures time up to reception of ultrasonic waves transmitted from the transmission and reception unit 100. The ultrasonic sensor 1 can measure a distance Lo from the ultrasonic sensor 1 to the object O based on the time measured by the timer 200.

Figure 2:
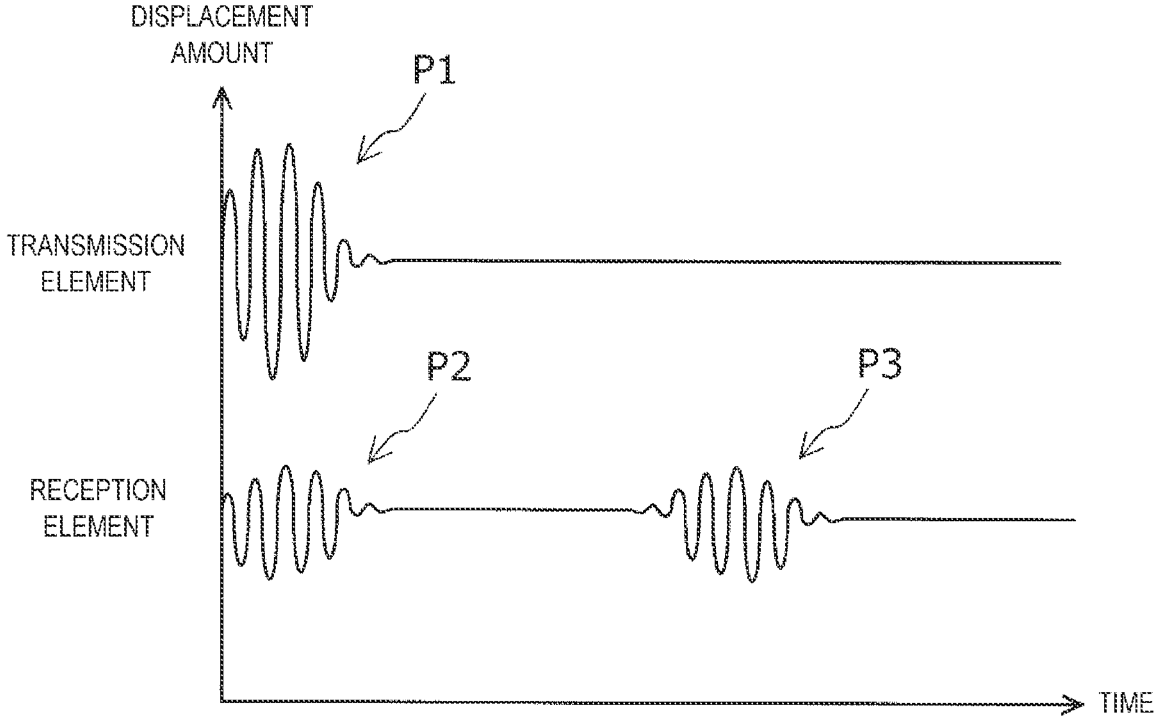
FIG. 2 is a graph showing vibration states of a transmission element and a reception element accompanying with transmission and reception of ultrasonic waves in the ultrasonic sensor in FIG. 1.

As indicated by a pulse P1 in FIG. 2, the transmission element **124*a* vibrates when transmitting ultrasonic waves from the transmission element 124*a*, and as indicated by a pulse P2 in FIG. 2, the reception element 124*b* also vibrates due to the transmission of the vibration of the transmission element 124*a*. When the ultrasonic waves are reflected by the object O and return to the transmission and reception unit 100, the reception element 124*b* is vibrated as indicated by a pulse P3 in FIG. 2. The ultrasonic sensor 1 measures the distance Lo from the ultrasonic sensor 1 to the object O based on the time from transmission of the pulse P1 to reception of the pulse P3**.

Specifically, in the present embodiment, vibration of the transmission element **124*a* and vibration of the reception element 124*b* are detected by voltages generated accompanying with the vibration of the transmission element 124*a*** and the vibration of the reception element 124_b_. That is, the distance Lo from the ultrasonic sensor 1 to the object O is measured based on applicable timing of a voltage exceeding a predetermined threshold. However, a measurement method of the distance Lo from the ultrasonic sensor 1 to the object O is not particularly limited, and may be a method of detecting a matter other than a voltage.

In FIG. 2, since the vibration of the reception element 124_b_ caused by the transmission of the vibration of the transmission element 124_a_ is attenuated immediately as indicated by the pulse P2, the pulse P3 can be accurately detected. However, if the vibration of the reception element 124_b_ caused by the transmission of the vibration of the transmission element 124_a_ continues for a long time, the vibration of the reception element 124_b_ caused by the transmission of the vibration of the transmission element 124_a_ and vibration of the reception element 124_b_ accompanying with the ultrasonic waves reflected by the object O and returning to the transmission and reception unit 100 may interfere with each other and crosstalk may occur. When such interference occurs, measurement accuracy of the distance Lo from the ultrasonic sensor 1 to the object O may be lowered. Here, the ultrasonic sensor 1 according to the present embodiment has a configuration of the transmission and reception unit 100 to be described below, so that such interference is less likely to occur.

Figure 3:
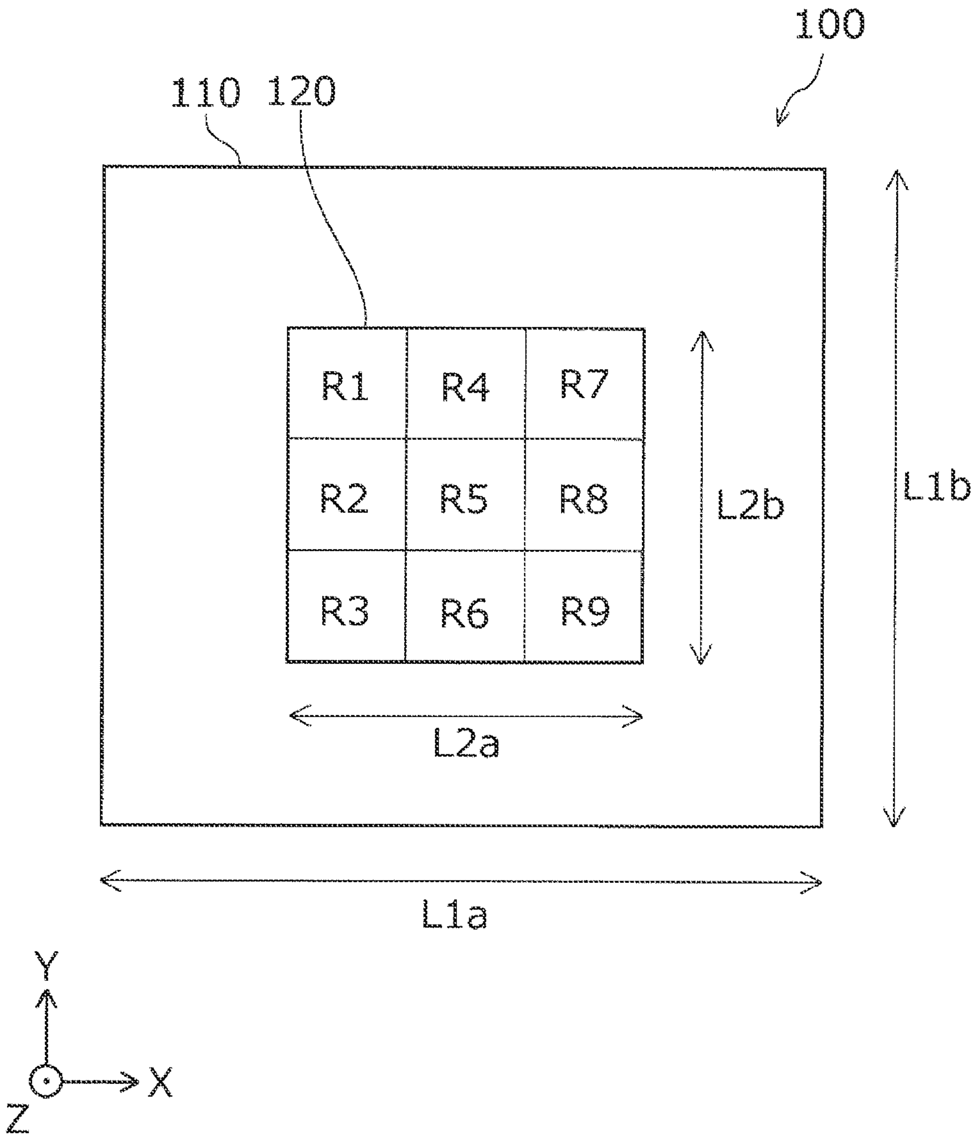
FIG. 3 is a schematic diagram showing a transmission and reception unit in the ultrasonic sensor in FIG. 1.

Next, a specific configuration of the transmission and reception unit 100 will be described. As shown in FIG. 3, the transmission and reception unit 100 includes a vibrator formation portion 120 in which the transmission element 124_a_ and the reception element 124_b_ are formed as vibrators 124 (see FIG. 4), and a peripheral portion 110 that is positioned in a periphery of the vibrator formation portion 120 and in which the vibrators 124 are not formed. Here, the transmission and reception unit 100 has a substantially flat plate shape. When the substantially plat plate shaped transmission and reception unit 100 is placed in a horizontal surface in FIG. 3 or the like, a state indicated in FIG. 3 serves as a plan view. In FIG. 3 and the like, an X axis direction is a horizontal direction, a Y axis direction is a horizontal direction orthogonal to the X axis direction, and a Z axis direction is a vertical direction.

In the transmission and reception unit 100 according to the present embodiment, both a length L1_a_ along the X axis direction of the peripheral portion 110 and a length L1_b_ along the Y axis direction of the peripheral portion 110 are about 1 cm, and both a length L2_a_ along the X axis direction of the vibrator formation portion 120 and a length L2_b_ along the Y axis direction of the vibrator formation portion 120 are about 5 mm. The vibrator formation portion 120 is divided into nine regions including regions R1 to R9. In each of the regions R1 to R9, 11 vibrators 124 are provided along the X axis direction, 11 vibrators 124 are provided along the Y axis direction, that is, a total of 121 vibrators 124 are provided. That is, a total of 1089 vibrators 124 are provided in the entire vibrator formation portion 120. The number of regions obtained by dividing the vibrator formation portion 120 and the number of the vibrators 124 in each region are not particularly limited.

Here, in the transmission and reception unit 100 according to the present embodiment, the vibrators 124 formed in the region R5 are used as the reception elements 124_b_, and the vibrators 124 formed in the regions R1 to R4 and regions R6 to R9 are used as the transmission elements 124_a_. All of the vibrators 124 have the same configuration. That is, all of the transmission elements 124_a_ have the same configuration, all of the reception elements 124_b_ have the same configuration, and all of the transmission elements 124_a_ and all of the reception elements 124_b_ have the same configuration.

In the present embodiment, the vibrators 124 formed in the region R5 are used as the reception elements 124_b_, and the vibrators 124 formed in the regions R1 to R4 and the regions R6 to R9 are used as the transmission elements 124_a_. However, the vibrators 124 formed in regions other than the region R5 may be used as the reception elements 124_b_, or the number of regions in which the vibrators 124 are used as the reception elements 124_b_ and the number of regions in which the vibrators 124 are used as the transmission elements 124_a_ may be changed. In addition, all vibrators 124 in each of the regions R1 to R9 may be used as the transmission elements 124_a_ and as the reception elements 124_b_.

Figure 4:
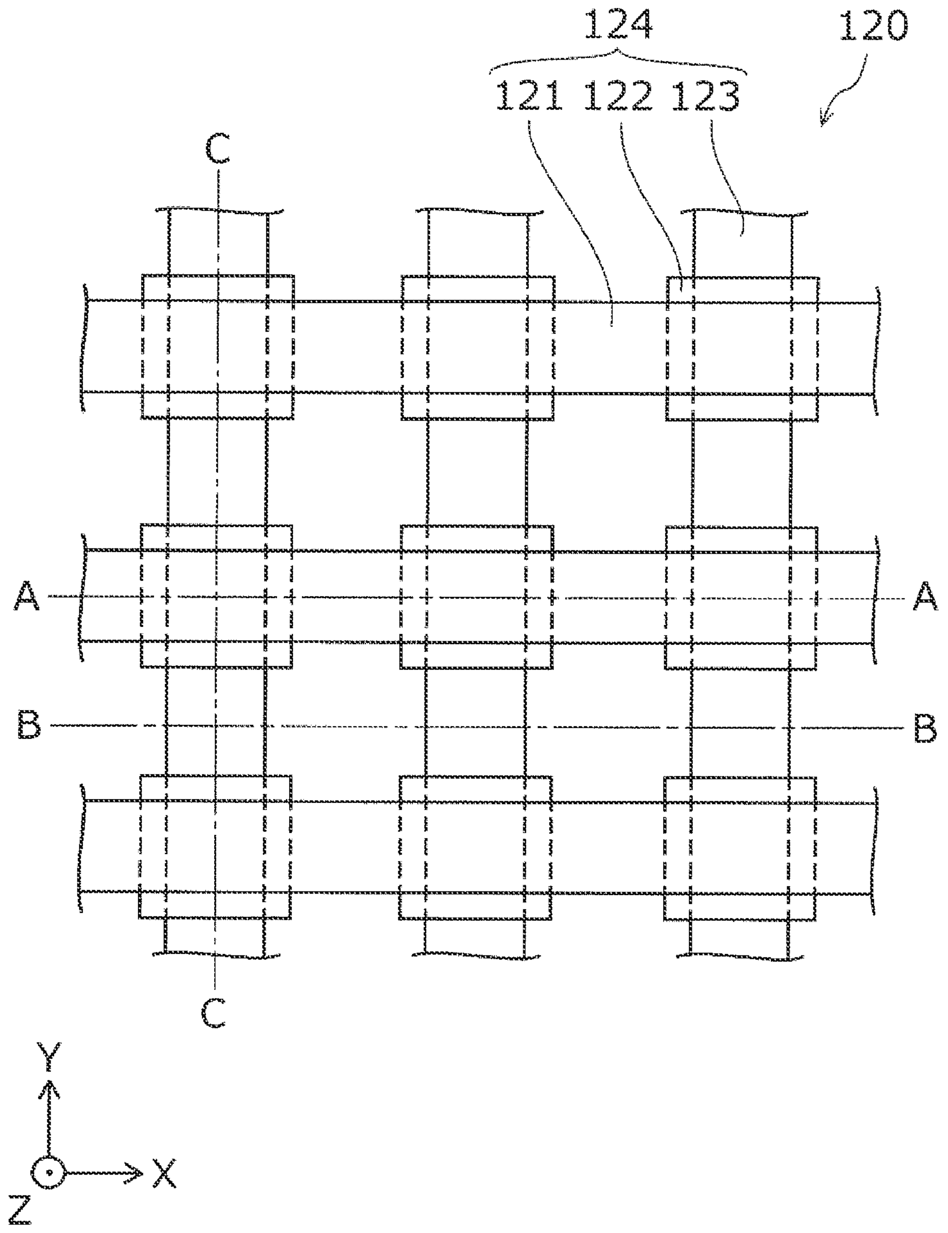
FIG. 4 is a schematic plan view showing vibrators in the ultrasonic sensor in FIG. 1.

As shown in FIG. 4, the vibrator 124 is formed by overlapping a first electrode 123, a piezoelectric layer 122, and a second electrode 121 along the Z axis direction. The first electrode 123 extends along the Y axis direction and a plurality of first electrodes 123 are provided in the X axis direction. The second electrode 121 extends along the X axis direction and a plurality of second electrodes 121 are provided in the Y axis direction. The piezoelectric layers 122 have a matrix shape and are provided along the X axis direction and along the Y axis direction.

A material of the first electrode 123 and the second electrode 121 is not limited as long as the material has conductivity. Examples of the material of the first electrode 123 and the second electrode 121 include a metal material such as platinum (Pt), iridium (Ir), gold (Au), aluminum (Al), copper (Cu), titanium (Ti), and stainless steel, a Tin oxide-based conductive material such as an indium tin oxide (ITO) and a fluorine-doped tin oxide (FTC)), an oxide conductive material such as a zinc oxide-based conductive material, strontium ruthenate ($SrRuO_3$), lanthanum nickel oxide ($LaNiO_3$), and element-doped strontium titanate, and a conductive polymer.

The piezoelectric layer 122 may use a typical composite oxide of a lead zirconate titanate (PZT)-based perovskite structure (an ABO three-type structure). Accordingly, it is easy to ensure a displacement amount of the vibrator 124 which is a piezoelectric element.

The piezoelectric layer 122 may use a composite oxide of a perovskite structure (an ABO three-type structure) containing no lead. Accordingly, the ultrasonic sensor 1 can be implemented by using a lead-free material which has a small load on the environment.

Examples of such a lead-free piezoelectric material include a BFO-based material containing bismuth ferrite (BFO and $BiFeO_3$). Bi is positioned at an A sit and iron (Fe) is positioned at a B site in BFO. Other elements may be added to BFO. For example, at least one element selected from manganese (Mn), aluminum (Al), lanthanum (La), barium (Ba), titanium (Ti), cobalt (Co), cerium (Ce), samarium (Sm), chromium (Cr), potassium (K), lithium (Li), calcium (Ca), strontium (Sr), vanadium (V), niobium (Nb), tantalum (Ta), molybdenum (Mo), tungsten (W), nickel (Ni), zinc (Zn), praseodymium (Pr), neodymium (Nd), and europium (Eu) may be added to BFO.

Another example of the lead-free piezoelectric material includes a KNN-based material containing potassium sodium niobate (KNN and $KNaNbO_3$). Other elements may be added to KNN. For example, at least one element selected from manganese (Mn), lithium (Li), barium (Ba), calcium (Ca), strontium (Sr), zirconium (Zr), titanium (Ti), bismuth (Bi), tantalum (Ta), antimony (Sb), iron (Fe), cobalt (Co), silver (Ag), magnesium (Mg), zinc (Zn), copper (Cu), vanadium (V), chromium (Cr), molybdenum (Mo), tungsten (W), nickel (Ni), Aluminum (Al), silicon (Si), lanthanum (La), cerium (Ce), praseodymium (Pr), neodymium (Nd), promethium (Pm), samarium (Sm), and europium (Eu) may be added to KNN.

The composite oxide of a perovskite structure includes a composite oxide deviated from a stoichiometric composition due to deficiency and excess or a composite oxide in which a part of elements is replaced with other elements. That is, as long as a perovskite structure is obtained, it is acceptable that the composite oxide inevitably deviates from a composition due to lattice mismatch, oxygen deficiency, or the like, apart of elements is replaced, and the like.

Figure 5:
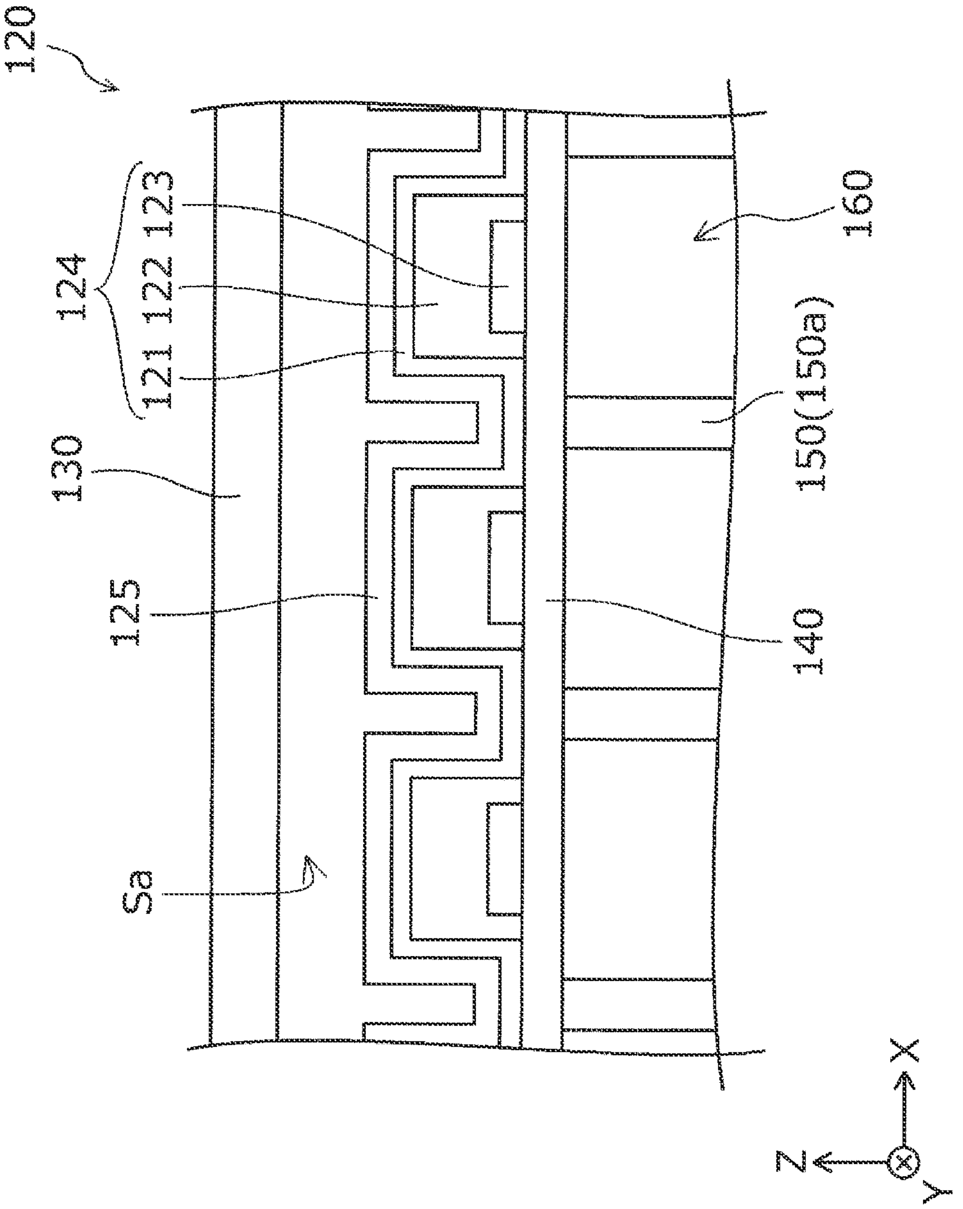
FIG. 5 is a schematic cross-sectional view showing a cross section along A-A in FIG. 4 in the transmission and reception unit in FIG. 3.
Figure 6:
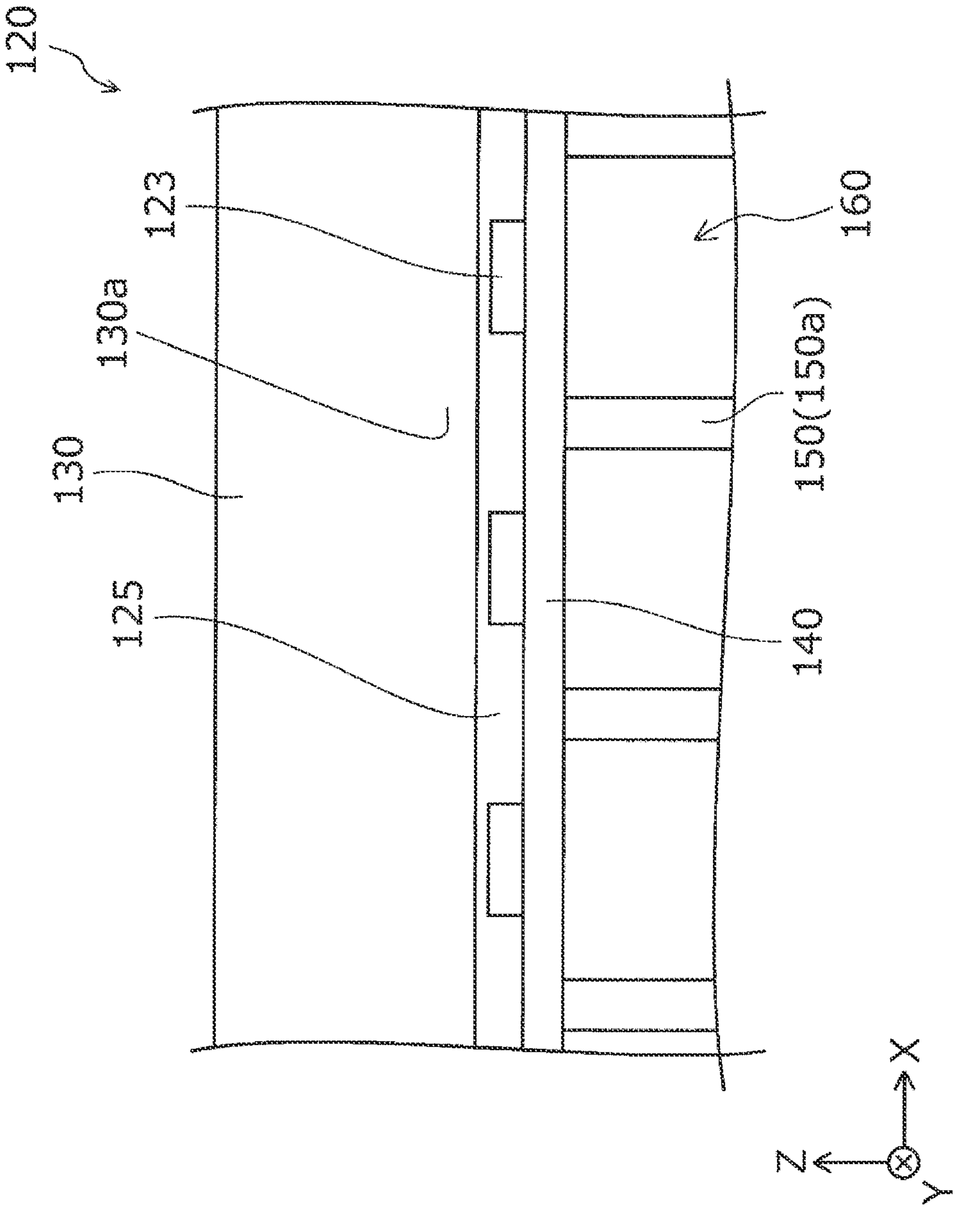
FIG. 6 is a schematic cross-sectional view showing a cross section along B-B in FIG. 4 in the transmission and reception unit in FIG. 3.
Figure 7:
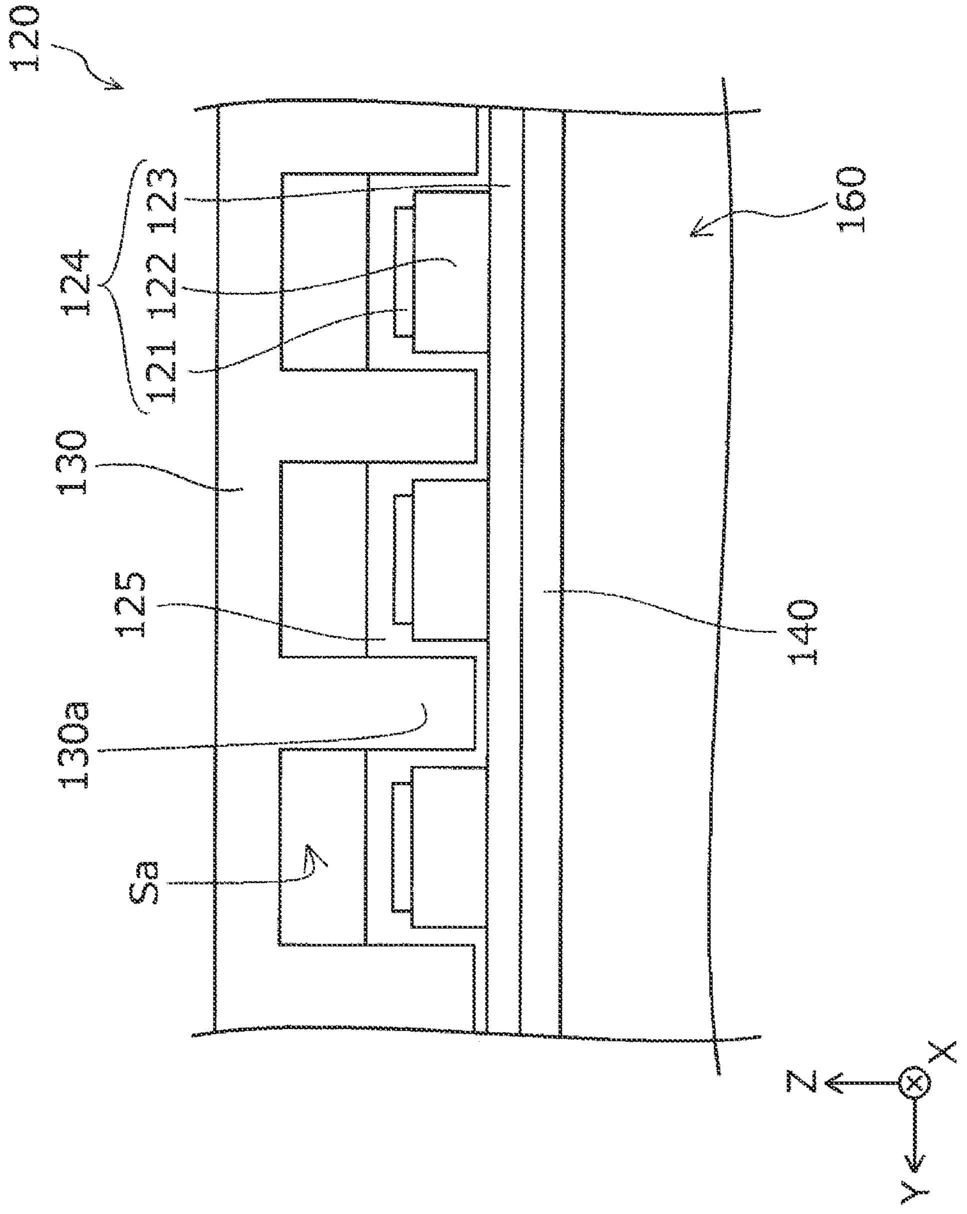
FIG. 7 is a schematic cross-sectional view showing a cross section along C-C in FIG. 4 in the transmission and reception unit in FIG. 3.

Next, a detailed configuration of the vibrator formation portion 120 will be described with reference to FIGS. 5 to 7. As shown in FIGS. 5 to 7, the ultrasonic sensor 1 according to the present embodiment includes a substrate 150 on which openings 160 are formed, a vibration plate 140 provided on the substrate 150 so as to close the openings 160, and the vibrator 124 including the first electrode 123, the piezoelectric layer 122, and the second electrode 121 stacked on the vibration plate 140 at an opposite side to the openings 160. A portion where the first electrode 123, the piezoelectric layer 122, and the second electrode 121 are completely overlapped with each other in the Z axis direction serves as the vibrator 124. The substrate 150 is formed of silicon. The substrate 150 includes partition walls 150*a* surrounding the openings 160. The vibration plate 140 is a stacked body formed of a silicon oxide film and zirconium oxide. The vibration plate 140 is supported by the partition walls 150*a* of the substrate 150.

When viewed in a plan view, the opening 160 has a shape having a high aspect ratio, for example, an aspect ratio of 1:70, at which a length in the Y axis direction is considerably larger than a length in the X axis direction. When viewed in a plan view, the vibrator 124 has a shape having a low aspect ratio, for example, an aspect ratio of 1, at which a length in the X axis direction is approximate to a length in the Y axis direction. Theoretically, it is ideal that the aspect ratio of the vibrator 124 is 1 considering to increase a strain in the Z axis direction. Alternatively, the aspect ratio of the vibrator 124 may be a value larger than 1. A plurality of vibrators 124 are provided with respect to one opening 160.

When a voltage is applied between the first electrode 123 and the second electrode 121, the vibrator 124 is elastically deformed together with the vibration plate 140, thereby generating ultrasonic waves. Since the easiness of bending and deforming the vibrator 124 varies depending on the materials, thickness, installation positions, and sizes of the vibrator 124 and the vibration plate 140, the vibrator 124 and the vibration plate 140 can be appropriately adjusted according to an application or a usage situation.

A charge signal whose frequency coincides or substantially coincides with a resonance frequency unique to each material may be applied to the vibrator 124, and the vibrator 124 is bent and deformed due to resonance.

The first electrode 123 is patterned with a predetermined width in the X axis direction, and is continuously provided across a plurality of vibrators 124 in the Y axis direction. The second electrode 121 is continuously provided across the plurality of vibrators 124 in the X axis direction and is patterned with a predetermined width in the Y axis direction. Although not shown, the second electrode 121 is pulled out in the X axis direction and is coupled to a common electrode extending in the Y axis direction. The vibrator 124 is driven by applying a voltage between the first electrode 123 and the second electrode 121. Although all of the plurality of vibrators 124 may be individually driven, the vibrators 124 are generally divided into several regions such as the regions R1 to R9 in the present embodiment and the vibrators 124 are driven on a region basis. In most cases, a fixed potential is applied to one of the first electrode 123 and the second electrode 121. Therefore, although not shown, it is common to provide wires for sharing the first electrode 123 or the second electrode 121 in each region or a wire for concentrating the wires.

As shown in FIGS. 5 to 7, an insulation layer 125 formed of alumina or the like is patterned on the second electrode 121. Further, a reinforcement plate 130 that seals a space Sa around the vibrators 124 and reinforces the substrate 150 is provided on a vibrator 124 side of the substrate 150. When the substrate 150 is thin and easy to break, the substrate 150 is prevented from breakage by providing the reinforcement plate that reinforces the substrate 150. The reinforcement plate 130 has columnar portions 130*a* that prevent vibration of the vibration plate 140. A joint portion of the reinforcement plate 130 joins with the substrate 150, so that the space Sa around the vibrators 124 is sealed. The columnar portion 130*a* functions as a prevention portion that prevents vibration of the vibration plate 140.

As shown in FIG. 5, the partition wall 150*a* is present between adjacent vibrators 124 in the X axis direction. The vibration plate 140 is fixed by the partition walls 150*a* of the substrate 150 at both portions outside two sides parallel to the Y axis direction of each vibrator 124. On the other hand, as shown in FIG. 7, the columnar portions 130*a* are provided at portions where the partition wall 150*a* is not present between vibrators 124 adjacent in the Y axis direction. Therefore, the vibration plate 140 is fixed by the columnar portions 130*a* provided at the reinforcement plate 130 or by the partition walls 150*a* of the substrate 150 at both portions outside two sides parallel to the X axis direction of each vibrator 124.

Figure 13:
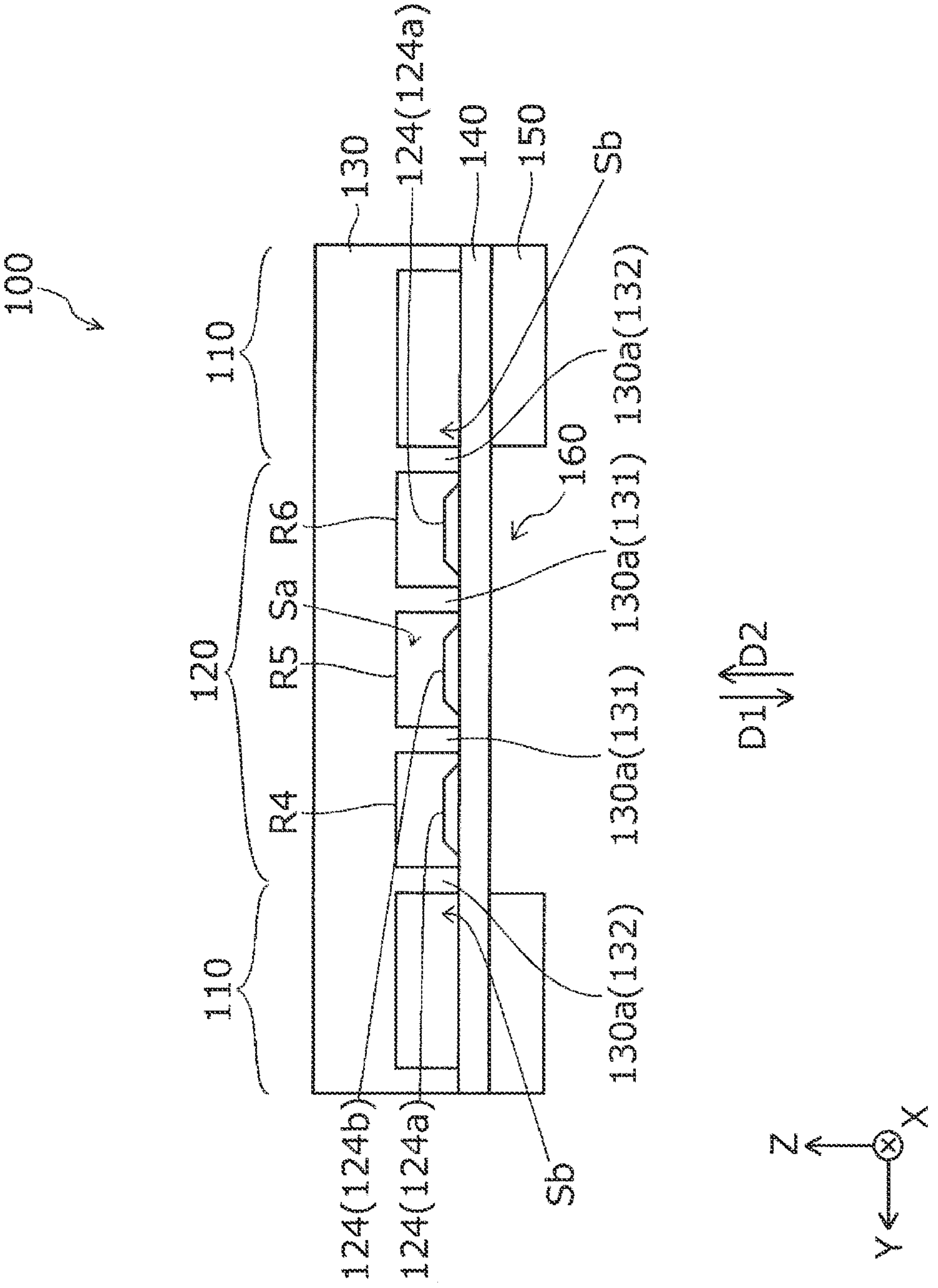
FIG. 13 is a schematic cross-sectional view showing a transmission and reception unit of an ultrasonic sensor according to a reference example in a simplified manner.
Figure 14:
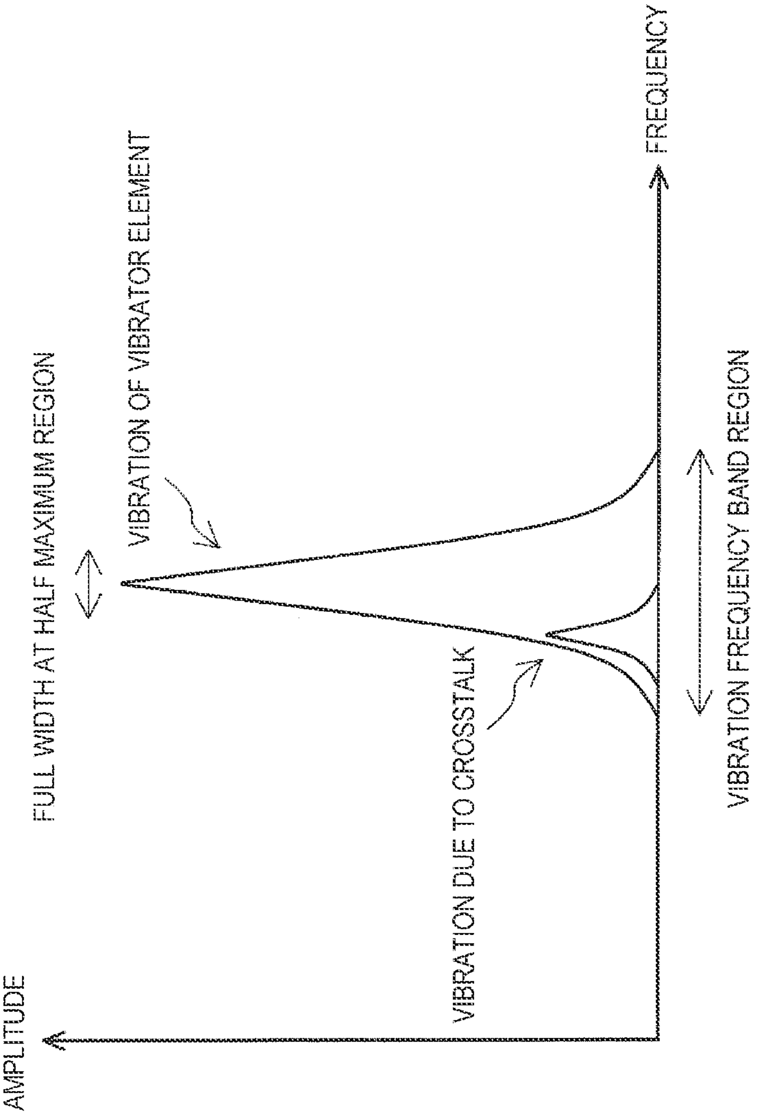
FIG. 14 is a graph showing a relation between a vibration frequency band region of vibrators and a frequency of vibration due to crosstalk in the ultrasonic sensor in FIG. 13.

Next, the ultrasonic sensor 1 according to the present embodiment will be described more specifically while comparing the ultrasonic sensor 1 according to the present embodiment in FIGS. 8 and 9 with an ultrasonic sensor according to a reference example in FIGS. 13 and 14. FIGS. 8 and 13 are cross-sectional views taken along positions of the region R4, the region R5, and the region R6 in FIG. 3, and the vibrators 124 in the region R4, the region R5, and the region R6 are omitted and only one vibrator 124 in each region is shown. In practice, a plurality of vibrators 124 are provided in any one of the region R4, the region R5, and the region R6 as described above. Accordingly, a plurality of columnar portions 130*a* that divide the vibrators 124 are provided.

As shown in FIG. 8, in the ultrasonic sensor 1 according to the present embodiment, the substrate 150, the vibration plate 140, and the reinforcement plate 130 are stacked along the Z axis direction. The reinforcement plate 130 is provided with a plurality of columnar portions 130*a*, and the columnar portion 130*a* includes a first wall portion 131 that divides the space Sa which is an arrangement space of the vibrator 124, and a second wall portion 132 that divides the vibrator formation portion 120 and the peripheral portion 110 and divides the space Sa and a space portion Sb formed in the peripheral portion 110. Here, the reason of providing the second wall portions 132 is to uniform a vibration state of the vibrator 124 adjacent to the peripheral portion 110 and a vibration state of the vibrator 124 that is not adjacent to the peripheral portion 110 and is divided by the first wall portion 131. In a configuration in which the peripheral portion 110 is not provided with the space portion Sb and the second wall portion 132 is not provided, when the vibrator 124 adjacent to the peripheral portion 110 is vibrated, the vibration may be constrained at a peripheral portion 110 side, and a vibration state thereof may be greatly different from a vibration state of the vibrator 124 that is not adjacent to the peripheral portion 110. In the present embodiment, the vibrator 124 is accommodated in the space Sa. However, the "arrangement space of the vibrator 124" refers to a configuration in which the vibrator 124 is accommodated in the space Sa as in the present embodiment, and also refers to a configuration in which the space Sa is positioned at a second direction side with respect to the vibrator 124, for example, and the vibrator 124 is not accommodated in the space Sa, as in an ultrasonic sensor according to a third embodiment to be described later in FIG. 11 and in an ultrasonic sensor according to a fourth embodiment to be described later in FIG. 12.

Similar to the ultrasonic sensor 1 according to the present embodiment shown in FIG. 8, the ultrasonic sensor according to the reference example shown in FIG. 13 also includes the space portion Sb in the peripheral portion 110 and the second wall portion 132 that divides the space portion Sb and the space Sa. However, when comparing FIG. 8 with FIG. 13, it will become apparent that the space portion Sb of the ultrasonic sensor 1 according to the present embodiment shown in FIG. 8 is narrower than the space portion Sb of the ultrasonic sensor according to the reference example shown in FIG. 13. When the ultrasonic sensor 1 according to the present embodiment has such a configuration, as shown in FIG. 9, a crosstalk vibration frequency that is a frequency of the vibration of the vibrator formation portion 120 due to crosstalk generated accompanying with the vibration of the vibrators 124 is outside a vibration frequency band region of the vibrators 124. On the other hand, in the ultrasonic sensor according to the reference example shown in FIG. 13, a crosstalk vibration frequency overlaps the vibration frequency band region of the vibrators 124 as shown in FIG. 14.

Since the reception element 124*b* is formed in the vibrator formation unit 120, when the crosstalk vibration frequency overlaps the vibration frequency band region of the vibrators 124, reception accuracy of ultrasonic waves that are transmitted from the transmission element 124*a* and that are reflected by the object O and are returned as reflected waves is lowered due to the vibration of the vibrator formation portion 120 caused by the crosstalk. On the other hand, when the crosstalk vibration frequency does not overlap the vibration frequency band region of the vibrators 124, reception accuracy of the reflected waves is less likely to be lowered.

As described above, the ultrasonic sensor 1 according to the present embodiment, serving as an ultrasonic device, includes the substrate 150, and the vibration plate 140 provided on the substrate 150 and having one or more vibrators that generate ultrasonic waves by vibration. The vibration plate 140 includes the vibrator formation portion 120 serving as a movable portion that is provided with the vibrators 124 and vibrates accompanying with the vibration of the vibrators 124, and the peripheral portion 110 serving as a fixed portion that is provided around the vibrator formation portion 120 and is fixed to the substrate 150. The peripheral portion 110 is configured such that a crosstalk vibration frequency that is a frequency of vibration caused by the crosstalk of the vibrator formation portion 120 accompanying with the vibration of the vibrators 124 is outside the vibration frequency band region of the vibrators 124. That is, a vibration frequency of the reflected waves based on waves transmitted from the movable portion and to be received by the movable portion is outside the vibration frequency band region of the vibrators 124.

Since the ultrasonic sensor 1 according to the present embodiment is configured such that the crosstalk vibration frequency is outside the vibration frequency band region of the vibrators 124, vibration caused by the crosstalk in the vibrator formation portion 120 can be prevented from affecting the vibration of the vibrators 124. That is, the ultrasonic sensor 1 according to the present embodiment includes the vibration plate 140 that has the region R5 serving as a first vibration portion in which the reception elements 124*b* are formed and that is vibrated accompanying with vibration of the transmission elements 124*a*, and the regions R1 to R4 and the regions R6 to R9 serving as a second vibration portion that are adjacent to the region R5 in which the transmission elements 124*a* are formed, and the ultrasonic sensor 1 according to the present embodiment is configured such that a vibration frequency band of the second vibration portion is different from a vibration frequency band of the first vibration portion. With such a configuration, sensitivity of the reception elements can be prevented from being affected by crosstalk caused by transmission of vibration of the first vibration portion accompanying with driving of the transmission elements 124*a* to the second vibration portion, and accuracy of the ultrasonic device can be prevented from lowering.

Figure 9:
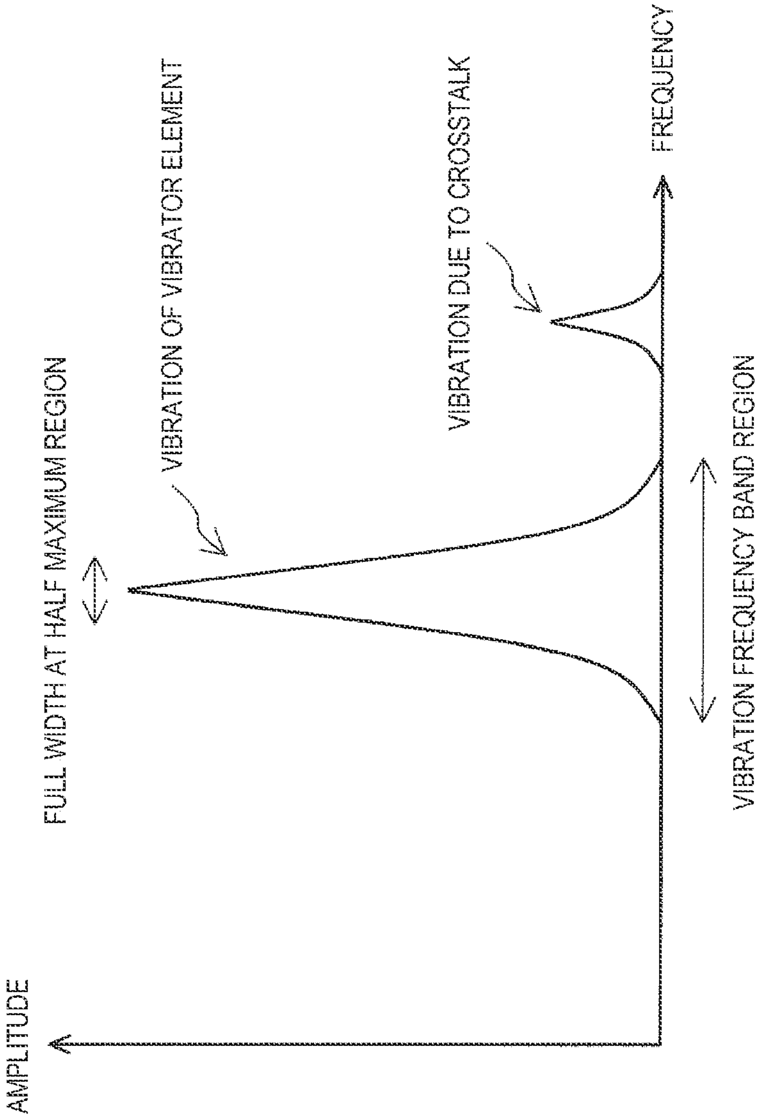
FIG. 9 is a graph showing a relation between a vibration frequency band region of vibrators and a frequency of vibration due to crosstalk in the ultrasonic sensor in FIG. 1.

Here, as shown in FIG. 9, the vibration frequency of the reflected waves (the crosstalk vibration frequency) is higher than the vibration frequency band region of the vibrators 124. If the crosstalk vibration frequency is lower than the vibration frequency band region of the vibrators 124, even when a crosstalk vibration frequency in a primary mode is outside the vibration frequency band region of the vibrators, a crosstalk vibration frequency in a secondary mode or a tertiary mode may fall within the vibration frequency band region of the vibrators 214. However, in the ultrasonic sensor 1 according to the present embodiment, since the crosstalk vibration frequency is higher than the vibration frequency band region of the vibrators 124, the crosstalk vibration frequency in the secondary mode or the tertiary mode can be prevented from falling within the vibration frequency band region of the vibrators 124.

Although the crosstalk vibration frequency is higher than the vibration frequency band region of the vibrators 124 in the ultrasonic sensor 1 according to the present embodiment as described above, the crosstalk vibration frequency may be lower than the vibration frequency band region of the vibrators 124. However, in this case, it is preferable that the crosstalk vibration frequency in the secondary mode or the tertiary mode does not fall within a full width at half maximum region of vibration frequencies of the vibrators 124.

In other words, in the ultrasonic sensor 1 according to the present embodiment, the vibration frequency band of the second vibration portion is higher than the vibration frequency band of the first vibration portion. If the vibration frequency band of the second vibration portion is lower than the vibration frequency band of the first vibration portion, even when a vibration frequency band of the first vibration portion transmitted as a primary mode is outside the vibration frequency band of the second vibration portion, a vibration frequency band of the first vibration portion transmitted as a secondary mode or a tertiary mode may fall within the vibration frequency band of the second vibration portion. However, in the ultrasonic sensor 1 according to the present embodiment, the vibration frequency band of the second vibration portion is higher than the vibration frequency band of the first vibration portion. Therefore, the vibration frequency band of the first vibration portion transmitted as the secondary mode or the tertiary mode can be prevented from falling within the vibration frequency band of the second vibration portion.

As described above, the ultrasonic sensor 1 according to the present embodiment includes a plurality of vibrators 124. The vibrator formation portion 120 is formed with the first wall portion 131 that divides the space Sa which is an arrangement space of the vibrators 124. The peripheral portion 110 has the space portion Sb and is formed with the second wall portion 132 that divides the space Sb and the vibrator formation portion 120. When comparing FIG. 8 with FIG. 13, it will become apparent that a volume of the space portion Sb is adjusted to be equal to or smaller than a predetermined volume, so that the crosstalk vibration frequency is adjusted to be higher than the vibration frequency band region of the vibrators 124 as shown in FIG. 9. That is, in the ultrasonic sensor 1 according to the present embodiment, the crosstalk vibration frequency is adjusted to be higher than the vibration frequency band region of the vibrators 124 by a simple method of adjusting the volume of the space portion Sb to be equal to or smaller than the predetermined volume. However, the method of adjusting the crosstalk vibration frequency to be higher than the vibration frequency band region of the vibrators 124 is not limited to the method described above, and may be a method in which, for example, the second wall portion 132 is formed of a different material from the first wall portion 131, and a volume of a different material region is adjusted to be equal to or smaller than a predetermined volume.

As shown in FIG. 8, in the ultrasonic sensor 1 according to the present embodiment, the vibration plate 140 is provided on the substrate 150 such that the vibrators 124 are provided on a surface of a first direction side corresponding to an upper side in FIG. 8 and a surface of a second direction (a direction opposite to the first direction) side faces the substrate 150. The reinforcement plate 130 is provided at the first direction side of the vibration plate 140. In this manner, the reinforcement plate 130 is provided at the first direction side of the vibration plate 140, so that an ultrasonic device can be configured to transmit ultrasonic waves at the second direction side as indicated by an arrow of the transmission direction D1 and an arrow of the reception direction D2 in FIG. 8. In the ultrasonic device having such a configuration, the substrate 150 can be prevented from breakage and accuracy of the ultrasonic device can be prevented from lowering. However, the present disclosure is not limited to the configuration shown in FIG. 8. Hereinafter, a specific example of an ultrasonic sensor including a transmission and reception unit 100 having a configuration different from that of the transmission and reception unit 100 shown in FIG. 8 will be described.

Second Embodiment

Figure 10:
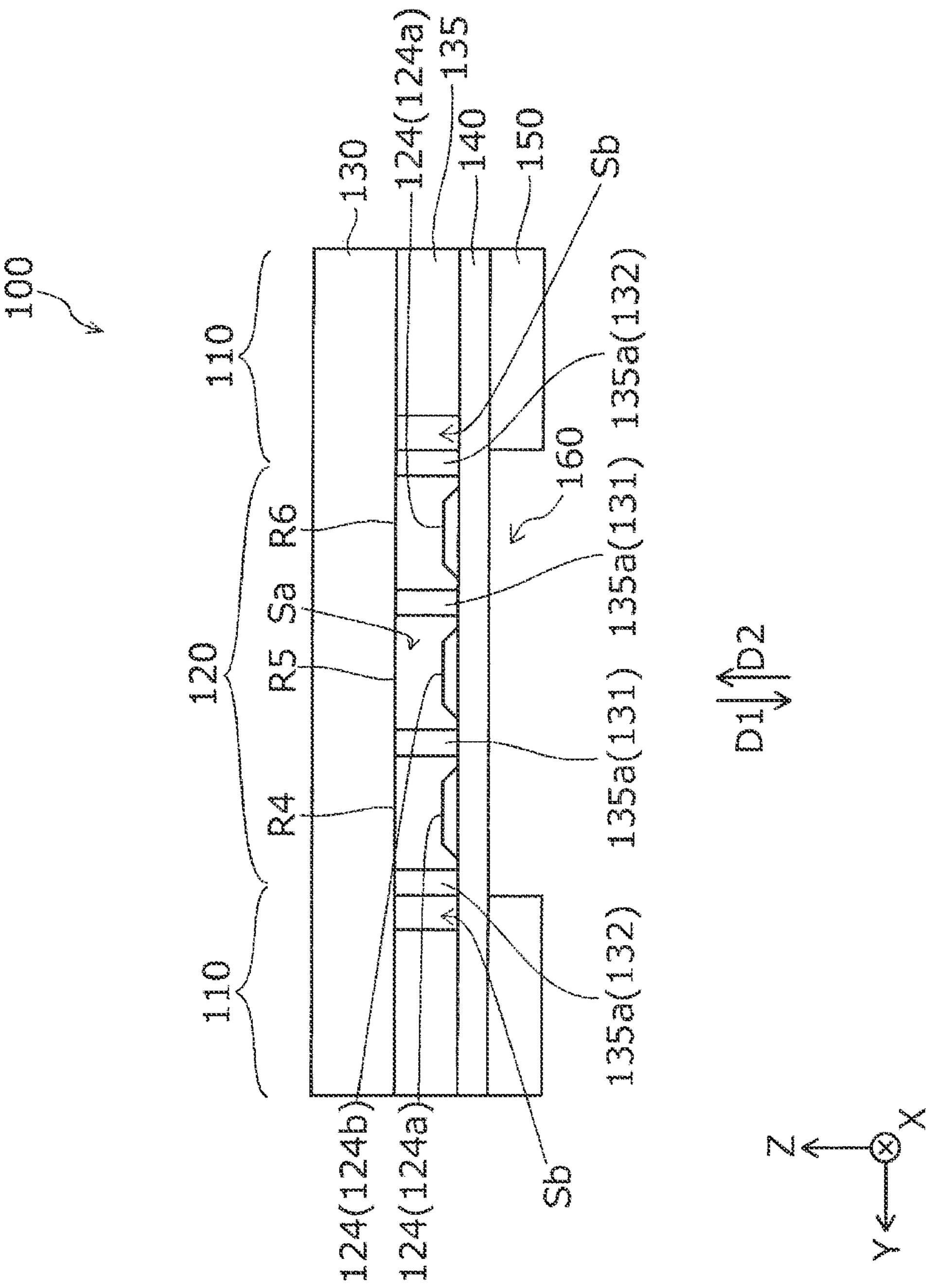
FIG. 10 is a schematic cross-sectional view showing a transmission and reception unit of an ultrasonic sensor according to a second embodiment in a simplified manner.

Next, an ultrasonic sensor according to a second embodiment will be described with reference to FIG. 10. FIG. 10 corresponds to FIG. 8 showing the ultrasonic sensor 1 according to the first embodiment. In FIG. 10, components the same as those in the first embodiment will be denoted by the same reference numerals and detailed description thereof will be omitted. The ultrasonic sensor according to the present embodiment has the same characteristics as the ultrasonic sensor 1 according to the first embodiment described above, and has the same configuration as the ultrasonic sensor 1 according to the first embodiment except for the following points. Specifically, the ultrasonic sensor according to the present embodiment has the same configuration as the ultrasonic sensor 1 according to the first embodiment except a configuration of the transmission and reception unit 100.

As shown in FIG. 10, the transmission and reception unit 100 of the ultrasonic sensor according to the present embodiment includes an intermediate member 135 provided between the reinforcement plate 130 and the vibration plate 140. With such a configuration, even when the reinforcement plate 130 and the vibration plate 140 are not directly in contact with each other, the ultrasonic device can be simply configured to transmit ultrasonic waves at the second direction side corresponding to a lower side in FIG. 10. The intermediate member may use, for example, a photosensitive resin.

In the transmission and reception unit 100 according to the present embodiment, in order to simplify a configuration of the reinforcement plate 130, the reinforcement plate 130 has a flat plate shape with no irregularities. The intermediate member 135 is provided with columnar portions **135*a* corresponding to the first wall portion 131 and the second wall portion 132. However, the present disclosure is not limited to such a configuration. Similar to the reinforcement plate 130 of the ultrasonic sensor 1 according to the first embodiment, the reinforcement plate 130 may be provided with the columnar portions 130*a* or the like and the intermediate member 135 is provided between the columnar portions 130*a* and the vibration plate 140**.

Third Embodiment

Figure 11:
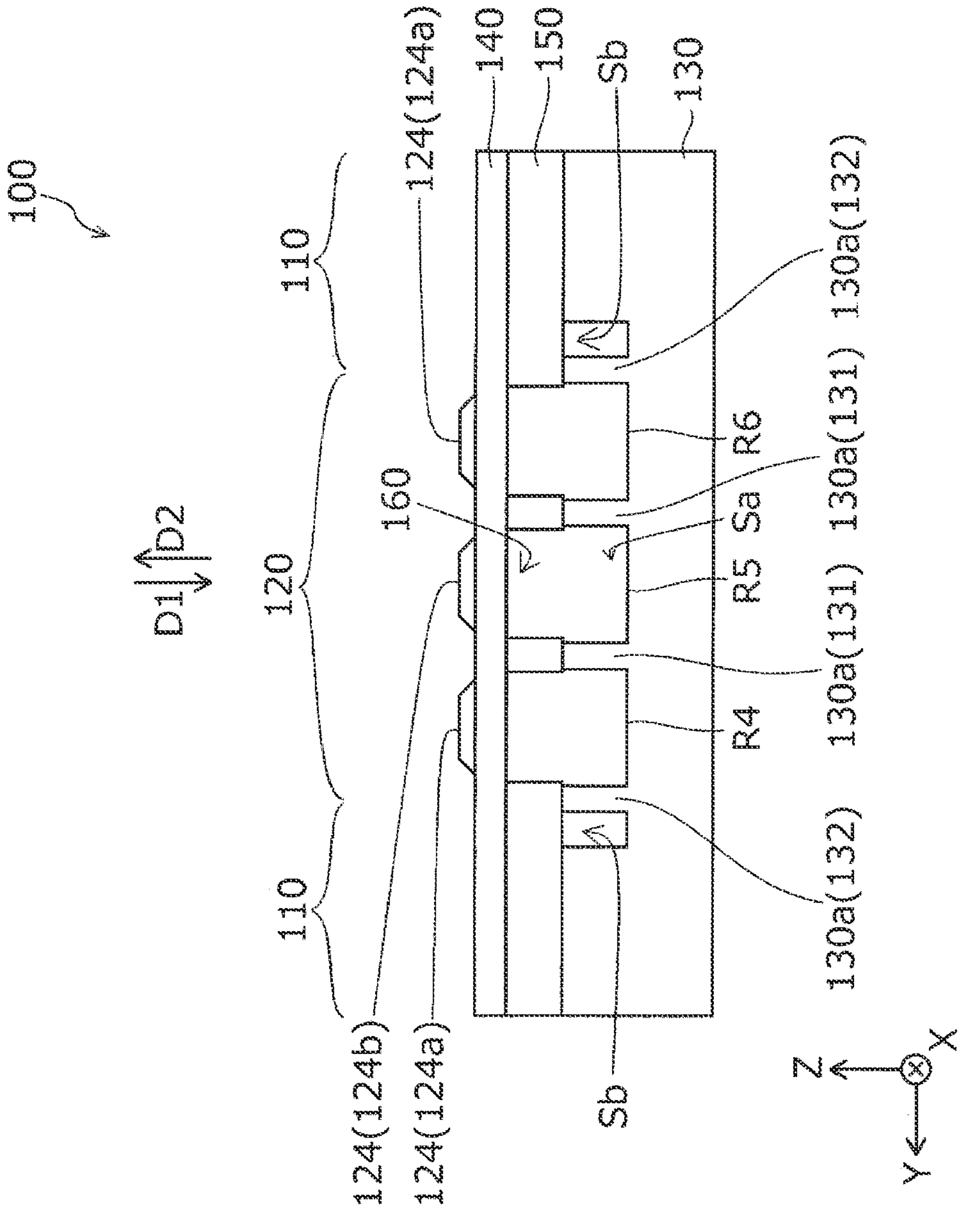
FIG. 11 is a schematic cross-sectional view showing a transmission and reception unit of an ultrasonic sensor according to a third embodiment in a simplified manner.

Next, an ultrasonic sensor according to a third embodiment will be described with reference to FIG. 11. FIG. 11 corresponds to FIG. 8 showing the ultrasonic sensor 1 according to the first embodiment. In FIG. 11, components the same as those in the first embodiment and the second embodiment will be denoted by the same reference numerals and detailed description thereof will be omitted. Here, the ultrasonic sensor according to the present embodiment has the same characteristic as the ultrasonic sensor 1 according to the above-described first embodiment and second embodiment, and has the same configuration as the ultrasonic sensor 1 according to the first embodiment and the second embodiment except for the following points. Specifically, the ultrasonic sensor according to the present embodiment has the same configuration as the ultrasonic sensor 1 according to the first embodiment and the second embodiment except a configuration of the transmission and reception unit 100.

As shown in FIG. 11, in transmission and reception unit 100 of the ultrasonic sensor according to the present embodiment, the vibration plate 140 is provided on the substrate 150 such that the vibrators 124 are provided on a surface of a first direction side corresponding to an upper side in FIG. 11 and a surface of a second direction (a direction opposite to the first direction) side faces the substrate 150. The reinforcement plate 130 is provided at the second direction side of the substrate 150. In this manner, the reinforcement plate 130 is provided at the second direction side of the vibration plate 140, so that the ultrasonic device can be configured to transmit ultrasonic waves at the first direction side as indicated by an arrow of the transmission direction D1 and an arrow of the reception direction D2 in FIG. 11. In the ultrasonic device having such a configuration, the substrate 150 can be prevented from breakage and accuracy of the ultrasonic device can be prevented from lowering.

Fourth Embodiment

Figure 12:
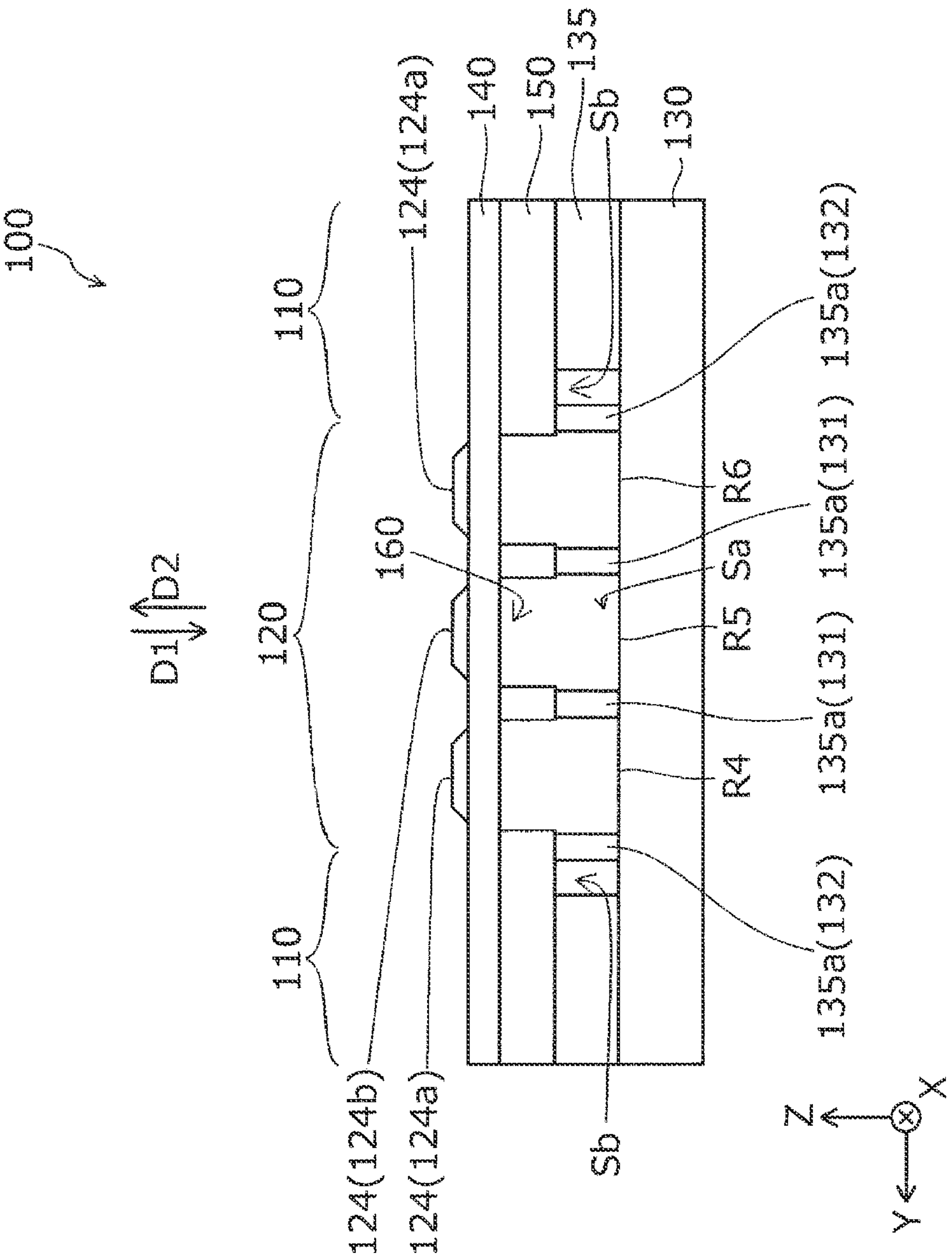
FIG. 12 is a schematic cross-sectional view showing a transmission and reception unit of an ultrasonic sensor according to a fourth embodiment in a simplified manner.

Next, an ultrasonic sensor according to a fourth embodiment will be described with reference to FIG. 12. FIG. 12 corresponds to FIG. 8 showing the ultrasonic sensor 1 according to the first embodiment. In FIG. 12, components the same as those in the first to third embodiments will be denoted by the same reference numerals and detailed description thereof will be omitted. Here, the ultrasonic sensor according to the present embodiment has the same characteristic as the ultrasonic sensor 1 according to the above-described first to third embodiments, and has the same configuration as the ultrasonic sensor 1 according to the first to third embodiments except for the following points. Specifically, the ultrasonic sensor according to the present embodiment has the same configuration as the ultrasonic sensor 1 according to the first to third embodiments except a configuration of the transmission and reception unit 100.

As shown in FIG. 12, the transmission and reception unit 100 of the ultrasonic sensor according to the present embodiment includes the intermediate member 135 provided between the reinforcement plate 130 and the substrate 150. With such a configuration, even when the reinforcement plate 130 and the substrate 150 are not directly in contact with each other, the ultrasonic device can be simply configured to transmit ultrasonic waves at the first direction side corresponding to an upper side in FIG. 12. The intermediate member may use, for example, a photosensitive resin.

In the transmission and reception unit 100 according to the present embodiment, in order to simplify a configuration of the reinforcement plate 130, the reinforcement plate 130 has a flat plate shape with no irregularities. The intermediate member 135 is provided with columnar portions 135*a* corresponding to the first wall portion 131 and the second wall portion 132. However, the present disclosure is not limited to such a configuration. Similar to the reinforcement plate 130 of the ultrasonic sensor 1 according to the third embodiment, the reinforcement plate 130 may be provided with the columnar portions 130*a* or the like and the intermediate member 135 is provided between the columnar portions 130*a* and the vibration plate 140.

The present disclosure is not limited to the embodiments described above, and can be implemented in various configurations without departing from the scope of the disclosure. In order to solve some or all of problems described above, or to achieve some or all of effects described above, technical features in the embodiments corresponding to technical features in the aspects described in the summary can be replaced or combined as appropriate. The technical features can be deleted as appropriate unless the technical features are described as essential in the present specification.

What is claimed is:

1. An ultrasonic device, comprising:

a substrate; and a vibration plate provided on the substrate and having one or more vibrators configured to generate an ultrasonic wave by vibration, wherein the vibration plate has a movable portion provided with the one or more vibrators and configured to vibrate accompanying with the vibration of the one or more vibrators, and a fixed portion fixed to the substrate, the substrate is on a first side of the vibration plate, the fixed portion has a space portion on a second side of the vibration plate opposite to the substrate, and a volume of the space portion corresponding to the fixed portion of the vibration plate is set to or smaller than a predetermined volume such that a vibration frequency of a reflected wave based on a wave transmitted from the movable portion and received by the movable portion is outside a vibration frequency band region of the one or more vibrators.

2. The ultrasonic device according to claim 1, wherein the vibration frequency of the reflected wave is higher than the vibration frequency band region of the one or more vibrators.

3. The ultrasonic device according to claim 2, further comprising a plurality of vibrators including the one or more vibrators, wherein a first wall portion is between the plurality of vibrators in the movable portion, a second wall portion is at a fixed portion side of a vibrator of the plurality of vibrators disposed at an end in arrangement of the plurality of vibrators, on a side of the second wall portion opposite to the vibrator is one of the space portion or a member formed of a material different from that of the second wall portion, and a volume of the member is adjusted to be equal to or smaller than the predetermined volume.

4. The ultrasonic device according to claim 1, further comprising a reinforcement plate configured to reinforce the substrate.

5. The ultrasonic device according to claim 4, wherein the one or more vibrators are on a first surface of the vibration plate, and the reinforcement plate is faces the first surface.

6. The ultrasonic device according to claim 5, further comprising an intermediate member between the reinforcement plate and the vibration plate.

7. The ultrasonic device according to claim 4, wherein the one or more vibrators are on a first surface of the vibration plate, and the reinforcement plate faces a second surface opposite to the first surface.

8. The ultrasonic device according to claim 7, further comprising an intermediate member between the reinforcement plate and the substrate.

9. An ultrasonic sensor, comprising:

the ultrasonic device according to claim 1; and a timer configured to measure time up to reception of the reflected wave of the ultrasonic wave transmitted by the vibration of the one or more vibrators.

10. An ultrasonic sensor, comprising:

the ultrasonic device according to claim 2; and a timer configured to measure time up to reception of the reflected wave of the ultrasonic wave transmitted by the vibration of the one or more vibrators.

11. An ultrasonic sensor, comprising:

the ultrasonic device according to claim 3; and a timer configured to measure time up to reception of the reflected wave of the ultrasonic wave transmitted by the vibration of the one or more vibrators.

12. An ultrasonic sensor, comprising:

the ultrasonic device according to claim 4; and a timer configured to measure time up to reception of the reflected wave of the ultrasonic wave transmitted by the vibration of the one or more vibrators.

13. An ultrasonic sensor, comprising:

the ultrasonic device according to claim 5; and a timer configured to measure time up to reception of the reflected wave of the ultrasonic wave transmitted by the vibration of the one or more vibrators.

14. An ultrasonic sensor, comprising:

the ultrasonic device according to claim 6; and a timer configured to measure time up to reception of the reflected wave of the ultrasonic wave transmitted by the vibration of the one or more vibrators.

15. An ultrasonic sensor, comprising:

the ultrasonic device according to claim 7; and a timer configured to measure time up to reception of the reflected wave of the ultrasonic wave transmitted by the vibration of the one or more vibrators.

16. An ultrasonic sensor, comprising:

the ultrasonic device according to claim 8; and a timer configured to measure time up to reception of the reflected wave of the ultrasonic wave transmitted by the vibration of the one or more vibrators.

* * * * *